US007152419B1

United States Patent
Armour et al.

(10) Patent No.: US 7,152,419 B1
(45) Date of Patent: Dec. 26, 2006

(54) REFRIGERATOR AIR CONTROL BAFFLE ASSEMBLY WITH SOUND DAMPENING

(75) Inventors: John Armour, Park Ridge, IL (US); Minh Nguyen, Summit, IL (US)

(73) Assignee: Armour Magnetic Components, Inc., Chicago, IL (US)

( * ) Notice: Subject to any disclaimer, the term of this patent is extended or adjusted under 35 U.S.C. 154(b) by 165 days.

(21) Appl. No.: 10/909,857

(22) Filed: Aug. 2, 2004

Related U.S. Application Data

(63) Continuation-in-part of application No. 10/449,434, filed on May 30, 2003, now Pat. No. 6,769,263.

(51) Int. Cl.
F25D 17/04 (2006.01)
F25D 21/00 (2006.01)

(52) U.S. Cl. .......... 62/187; 62/150; 236/49.3; 454/298; 454/334

(58) Field of Classification Search ........... 62/187, 62/186, 150, 275; 236/49.3; 454/324, 334, 454/298; 137/625.33; 251/129.1, 251
See application file for complete search history.

(56) References Cited

U.S. PATENT DOCUMENTS

| 4,682,474 | A | * | 7/1987 | Janke ..................... 62/187 |
| 4,688,393 | A | * | 8/1987 | Linstromberg et al. ....... 62/187 |
| 4,732,010 | A | * | 3/1988 | Linstromberg et al. ....... 62/187 |
| 4,903,501 | A | * | 2/1990 | Harl ............................ 62/187 |
| 4,924,680 | A | * | 5/1990 | Janke et al. .................. 62/187 |
| 5,375,413 | A | * | 12/1994 | Fredell et al. ................ 62/187 |
| 5,477,699 | A | * | 12/1995 | Guess et al. .................. 62/187 |
| 5,490,395 | A | * | 2/1996 | Williams et al. ............. 62/187 |

* cited by examiner

*Primary Examiner*—Marc Norman
(74) *Attorney, Agent, or Firm*—Jenner & Block LLP

(57) ABSTRACT

A baffle assembly for an air control device that reduces the noise associated with operation of solenoid coils. The invention employs one or two solenoid coils mounted in a frame and attached to a fixed plate. An armature, located inside the solenoid coils, is connected on opposite ends to two movable plates which rest on top of the fixed plate. Energizing a solenoid coil moves the armature, which moves the movable plates relative to the fixed plate. Apertures in the plates are provided to control air flow through the plates. The assembly includes sound dampeners to impede the movable plates from making contact with the frame, thereby reducing the amount of noise associated with operation of the solenoid coils.

15 Claims, 15 Drawing Sheets

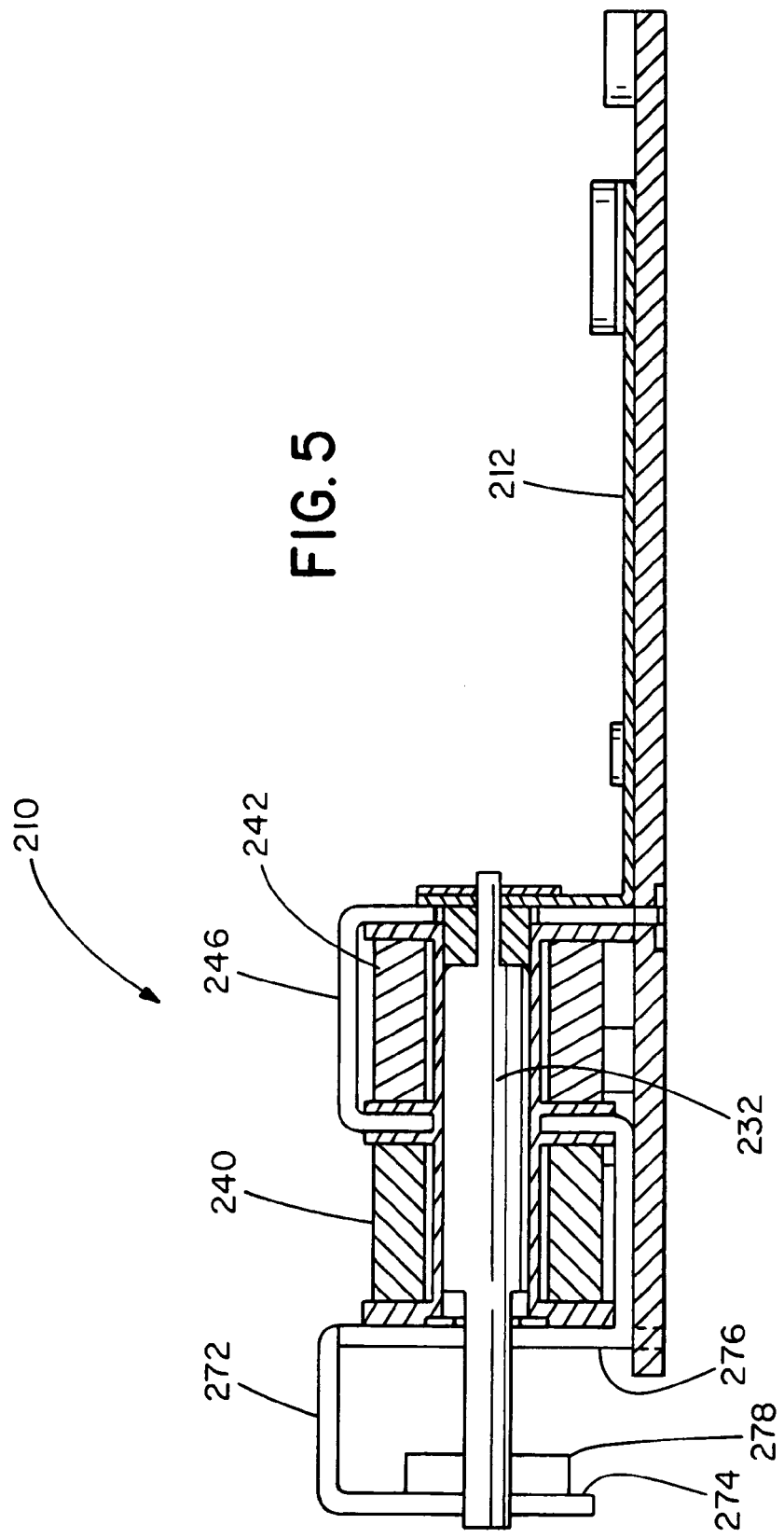

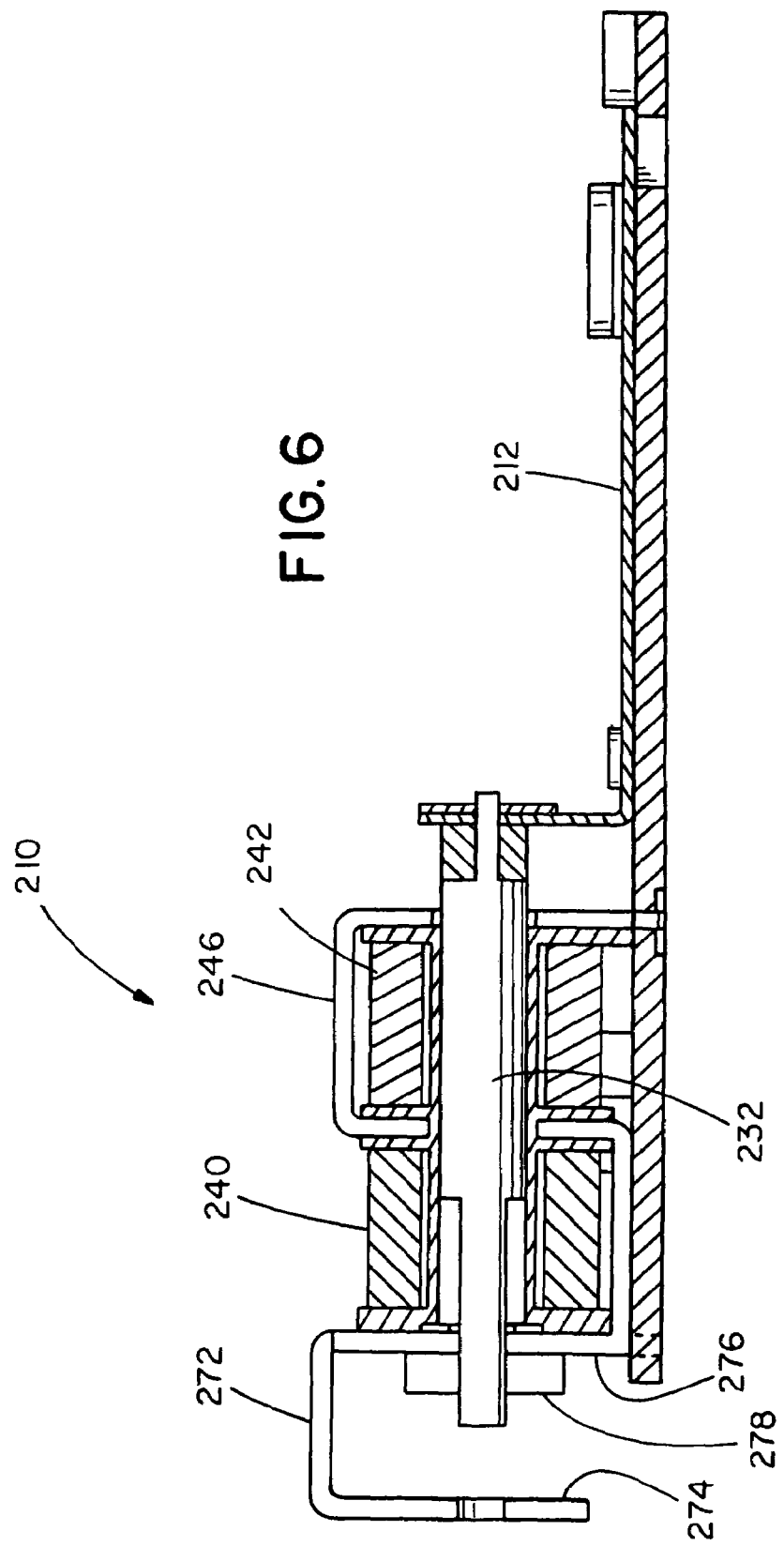

REFRIGERATOR AIR CONTROL BAFFLE ASSEMBLY WITH SOUND DAMPENING

RELATED APPLICATIONS

This application is a continuation-in-part of application Ser. No. 10/449,434 filed on May 30, 2003 now U.S. Pat. No. 6,769,263.

FIELD OF THE INVENTION

This invention relates generally to a baffle assembly in an air control device for a refrigerator, and more particularly to an improved double baffle assembly with sound dampening characteristics,

BACKGROUND OF THE INVENTION

In conventional dual-compartment refrigerators, a single evaporator fan introduces chilled air into the freezer compartment by blowing air across the evaporator coils of the refrigeration unit. Chilled air is introduced into the fresh food compartment through one or more air passages in a divider wall between the two compartments. An air control device is located within one or more of the air passages to control the flow of chilled air into the fresh food compartment.

Air control devices typically employ a baffle assembly having a fixed plate and a moveable plate which can slide longitudinally relative to the fixed plate between two distinct positions. In a first or open position, a plurality of apertures contained in each plate are aligned, such that chilled air is allowed to flow through apertures and into the fresh food compartment. In a second, or closed position the plurality of apertures are unaligned and blocked, such that the baffle assembly prevents chilled air from flowing into the fresh food compartment when in the closed position. The movement of the movable plate can be controlled by either an electric motor by solenoid coils.

An alternative air control device which does not employ a baffle assembly is a damper assembly having one large opening and a damper to restrict air flow. In a damper assembly, the damper rotates about an axis point along one side. When closed, the damper abuts and covers the opening into the fresh food compartment, impeding the flow of air. When cooling is needed, the damper is rotated to an open position, allow air to flow into the fresh food compartment. The damper is usually controlled by an electric motor attached to the assembly.

Typically, the air passages into the fresh food compartment are located in the back of the compartment, opposite the door. This is mainly because there is more space in the wall at the back of the refrigerator than there is in the sides to accommodate the space requirements of either a damper assembly or baffle assembly. A problem with placement of the air passage in the rear is that since most of the heat entering the fresh food compartment comes through the door when opened, a temperature gradient is created, wherein the back of the fresh food compartment is colder than the front, near the door. It is desirable, therefore, to create air passages in the side walls of the fresh food compartment in order to create a more uniform temperature throughout the fresh food compartment. It is thus desirable to reduce the width of an air control device to allow it to be placed in the thinner side walls of the refrigerator.

The placement of air control devices in the sidewalls close to the door of the fresh food compartment presents a problem regarding the noise level of the device. Current devices, employing either an electric motor or solenoid coils, produce an unacceptable amount of noise to be located near the door. The noise is caused by the electric motors and the solenoids, and by the banging of the movable plates in the baffle assemblies. Some of the noise in baffle assemblies is caused by the excessive amount of force employed to move the baffles. Thus, it is desirable to create an air control device that minimizes the noise produced by its operation.

Some baffle assemblies are constructed with the movable plate connected to one end of an armature and the fixed plate attached to a frame holding two solenoid coils positioned next to each other. The armature is located radially inside the cavities of the solenoid coils. Activation of one of the solenoid coils causes the armature to slide within the solenoid coils' cavities, causing the movable plate to slide longitudinally relative to the fixed plate. The direction of the armature's movements is dependent upon which of the solenoid coils is activated. Alternatively, the armature can be located radially inside the cavity of a single solenoid coil, where opposite electrical charges applied to the solenoid coil cause the armature to move in opposite directions within the solenoid coil's cavity.

In a refrigerator employing one or more air control devices with baffle assemblies as described above, one or more temperature sensors are positioned in various locations of the refrigerator. Each sensor is electrically connected to an air control device. If the baffle assembly is in the closed position and a sensor in the fresh food compartment detects an air temperature at or above a preset level, the sensor sends an electric signal to the baffle assembly to activate one of the solenoid coils, causing the armature to slide the movable plate relative to the fixed plate. As a result, the apertures in the two plates are aligned, thereby allowing chilled air to flow into the fresh food compartment. Likewise, when the baffle assembly is in the open position and the sensor detects an air temperature in the fresh compartment at or below a preset level, an electric signal is sent to the baffle assembly to activate the other solenoid coil, causing the movable plate to slide in the opposite direction. As a result, the apertures become unaligned and blocked, stopping the flow of chilled air to the fresh food compartment.

In order to minimize the amount of time that the solenoid coils remain energized, the system may have a further feature wherein the solenoid coils are deactivated when the temperature sensor detects a change in temperature after initial activation. For example, after the temperature sensor indicates that the air temperature in the fresh food compartment is above the pre-set maximum and the solenoid coil is energized to place the baffle assembly into the opened position, the solenoid coil will remains energized until the temperature sensor detects that the air temperature has stopped increasing. This indicates that the baffle assembly has in fact opened and that chilled air is flowing into the fresh food compartment. The baffle assembly then remains in the opened position after the solenoid coil has been deactivated.

In a conventional refrigerator, moisture at room temperature enters the fresh food compartment when the door of the fresh food compartment is opened. Moisture can accumulate throughout the fresh food compartment, including on the baffle assembly. When chilled air from the freezer compartment subsequently flows through the baffle assembly, the accumulated moisture may freeze, causing ice to form and immobilize the movable plate of the baffle assembly. Consequently, the baffle assembly becomes frozen, making it impossible to regulate the temperature of the fresh food compartment.

The prior art methods for preventing or removing ice on a baffle assembly are expensive and lead to high energy usage. In addition, some of the methods contribute to the premature failure of the solenoid coil. In particular, the currently preferred method uses a solenoid bobbin wherein the cavity created by the solenoid coil has an inside diameter that is larger than the outside diameter of the armature used to slide the movable plate. When the movable plate is idle, ice accumulates between the movable and fixed plates. Upon activation of the solenoid, the accumulated ice initially prevents movement of the plate. However, loose fit of the armature within the solenoid coil allows the armature to move up and down or side-to-side, ultimately breaking the accumulated ice. This additional movement causes added stress to be placed upon the coil while energized, which can lead to premature failure of the coil.

The problem is exacerbated because heat, generated as a natural by-product of energizing solenoid coils, becomes trapped within the solenoid coils. Since the plates are typically not made of a heat-conductive material, the heat does not migrate away from the solenoid coils and instead builds up within the coils. In the prior art described above, the solenoid coils are energized for a longer period because of the need to break free of the ice. The build up of excessive heat is one cause of premature failure of the solenoid coils.

In another prior art method, the solenoid coil periodically and momentarily reverses the direction of the movable plate to prevent the accumulation of ice. Specifically, when the temperature of the fresh food compartment rises above a preset level, the solenoid coil is activated to slide the movable plate to the open position. Once the temperature sensor detects that the temperature has stopped rising, the solenoid coil is deactivated. While in the open position, the solenoid coil is periodically activated to momentarily slide the movable plate into the closed position then immediately returned to the open position to prevent ice from accumulating. Likewise, when the baffle assembly is in the closed position, the solenoid coil is periodically activated to momentarily slide the movable plate into the open position, and then immediately back into the closed position. This method creates unnecessary energy consumption and adds a stress on the solenoid coil as a result of being regularly energized, leading to premature failure of the coils.

In another method, the armature used to slide the movable plate is substantially smaller than the cavity produced by the solenoid coil such that the armature rests within the solenoid coil at an angle. The movable plate rests on top of studs located on the top surface of the fixed plate. Because of the space between the plates created by the studs, any accumulation of ice results in a weak bond. The solenoid coil is periodically energized so that the movable plate maintains its current position and does not slide into another position. When the solenoid coil is energized, the magnetic field generated around the circumference of the angled armature causes the armature to straighten within the solenoid coil. As the angled armature straightens, the movable plate moves outward and away from the fixed plate, thereby breaking the weak ice bonds that had formed between the movable plate and the fixed plate. This method uses an additional amount of energy because the solenoid coils are periodically energized, leading to premature failure of the solenoid coils from the added stress of being regularly energized.

In other prior art methods of eliminating accumulated ice, a resistance wire is molded into the plates. Such an arrangement is shown in Harl, U.S. Pat. No. 4,903,501. The molding process increases the cost of manufacturing the baffle assembly. Additionally, a separate circuit is utilized to heat the plates, which increases the complexity of the air control device, the cost of manufacturing the refrigerator and the amount of energy required.

Still other prior art methods use heaters external to the baffle assembly to prevent the plates from freezing. Such an arrangement is shown in Fujiya, U.S. Pat. No. 4,499,917. This method maintains a plurality of heaters at various points within the baffle assembly which are activated to prevent ice from accumulating on the plates. In this method, an added electric circuit is required for the heaters, increasing the energy usage.

In some cases, it may be desirable to mount an air control device employing a baffle assembly within the refrigerator at an angle other than horizontal. However, depending upon the position of the movable plate relative to the pull of gravity, the solenoid coils may be required to be constantly energized to maintain the movable plate in a position that is subject to the force of gravity, thereby consuming additional energy.

All of these methods for preventing or removing the accumulation of ice increase energy consumption, either by requiring the solenoid coils to be energized more often or for longer periods of time, and/or by the use of heaters. In addition, the solenoid coils may be susceptible to premature failure due to the coils inability to effectively dissipate the heat generated while energized.

The present invention overcomes the problems associated with removing accumulated ice from a baffle assembly in an air control device in a novel fashion. In addition, the invention accomplishes this while using less energy than the prior art.

SUMMARY OF THE INVENTION

In accordance with the present invention, a baffle assembly for an air control device is provided that eliminates the accumulation of ice while consuming less energy as compared to the prior art. In addition, an air control device is provided having a reduced in-line thickness and noise dampening features that allow it to be placed in the side-walls of refrigerators and near the door.

The baffle assembly includes one or two solenoid coils attached to a fixed plate, or mounted in a frame that is attached to a fixed plate. To support the magnetic fields generated by the solenoid coils, it is preferable for the frame to be constructed of a magnetic material. An armature, located inside the solenoid coil or coils, is connected to a movable plate. The movable plate rests on top of the fixed plate. When a solenoid coil is energized, the armature moves through the cavity created by the solenoid coil or coils, thereby sliding the movable plate relative to the fixed plate. Both plates have one or more apertures arranged such that in one position, portions of one of the plates covers the apertures of the other plate and in another position, the apertures on the plates align or are unobstructed. Depending on the position of the movable plate relative to the fixed plate, chilled air can enter, or is prevented from entering, the fresh food compartment of a refrigerator.

While the solenoid coil is energized, heat is generated as a natural consequence. Normally, heat generated in this way is contained within the solenoid coil, adversely affecting the coil. However, in the present invention, the armature and the movable plate are constructed of thermoconductive material. As a result, heat travels from the solenoid coil, through the armature, and throughout the movable plate. In addition, the fixed plate and the solenoid frame may also be constructed of thermoconductive material, in which case the heat also conducts from the solenoid coil, through the frame, and throughout the fixed plate. Heat conduction throughout the plates melts any accumulated ice that is immobilizing the movable plate, thereby freeing the movable plate from the fixed plate.

One or more temperature sensors are located in the fresh food compartment and are electronically connected to the solenoid coils. When a temperature sensor detects an air temperature at or above a preset maximum or at or below a preset minimum, the appropriate solenoid coil is energized to move the movable plate into an open or closed position, respectively. When the temperature has stopped rising or falling, the temperature sensor sends a signal that deenergizes the solenoid coil. The solenoid coils are thus only energized long enough to insure that the baffle assembly has been opened or closed, which also ensures that the plates have been freed of any ice buildup. The use of heat dissipated from the solenoid coils to melt the ice provides an energy savings over the prior art.

According to a further aspect of the invention, the armature assembly used to slide the movable plate is composed in part of a thermoconductive magnetic material and in part of thermoconductive non-magnetic material. The non-magnetic portion of the armature is situated closest to the point of attachment with the movable plate. Since the entire armature is not made of magnetic material, the solenoid coil does not have to overcome the magnetic properties of the non-magnetic portion of the armature. Thus, the solenoid coil needs to produce a smaller magnetic field to move the armature, requiring less energy to slide the movable plate from one position to the other. The energy generated, however, is still sufficient to effectively melt any accumulated ice.

According to another aspect of the invention, a problem with the angle at which the baffle assembly can be mounted is resolved. If the baffle assembly is mounted at an angle other than horizontal, gravity could cause the movable plate to slide into an undesired position after the solenoid coil is deenergized. To overcome this, the armature connected to the movable plate is extended out the end of the solenoid coil opposite the movable plate. An extension is added to the frame that extends over the extended portion of the armature. A magnet is attached to the extended end of the armature under the frame extension. As the armature moves through the cavity created by the solenoid coil, the magnet makes contact with either the frame extension or the outside of the solenoid frame and holds the movable plate in the desired position.

According to yet another aspect of the invention, when the baffle assembly is in the closed position, the movable plate is optionally held slightly open. During extended periods when the door to the fresh food compartment of the refrigerator is kept closed, such as at night, keeping the movable plate in a slightly opened position allows the fresh food compartment to maintain a desired temperature for a longer period of time, without requiring the refrigeration unit to generate more chilled air. By reducing the frequency the compressor in the refrigeration unit is activated, the refrigerator uses less energy.

In yet another aspect of the invention, the fixed plate has one or more sets of apertures located on opposite ends of the fixed plate, with the solenoid coil or coils attached to the fixed plate between the two sets of apertures. Two movable plates are attached to opposite ends of the armature. Movement of the armature causes the movable plates to move in unison resulting in all the apertures being either blocked or unobstructed. This allows more air to flow into the fresh food compartment while employing only one armature and one set of solenoid coils.

One aspect of the invention includes improvements to reduce the in-line thickness of the baffle assembly by constructing cavities in the fixed plate to accept the solenoid coils in a flush manner.

In another aspect of the invention, noise dampening features are added to curtail the amount of noise produced by the air control device when operated.

Other aspects and advantages of the present invention will become apparent from the following detailed description and upon reference to the accompanying drawings.

BRIEF DESCRIPTION OF THE DRAWINGS

FIG. 5 is a sectional view of another embodiment of the invention in the opened position.

FIG. 6 is a sectional view of the same embodiment as FIG. 4, in the closed position.

DETAILED DESCRIPTION OF THE INVENTION

Figure 1:
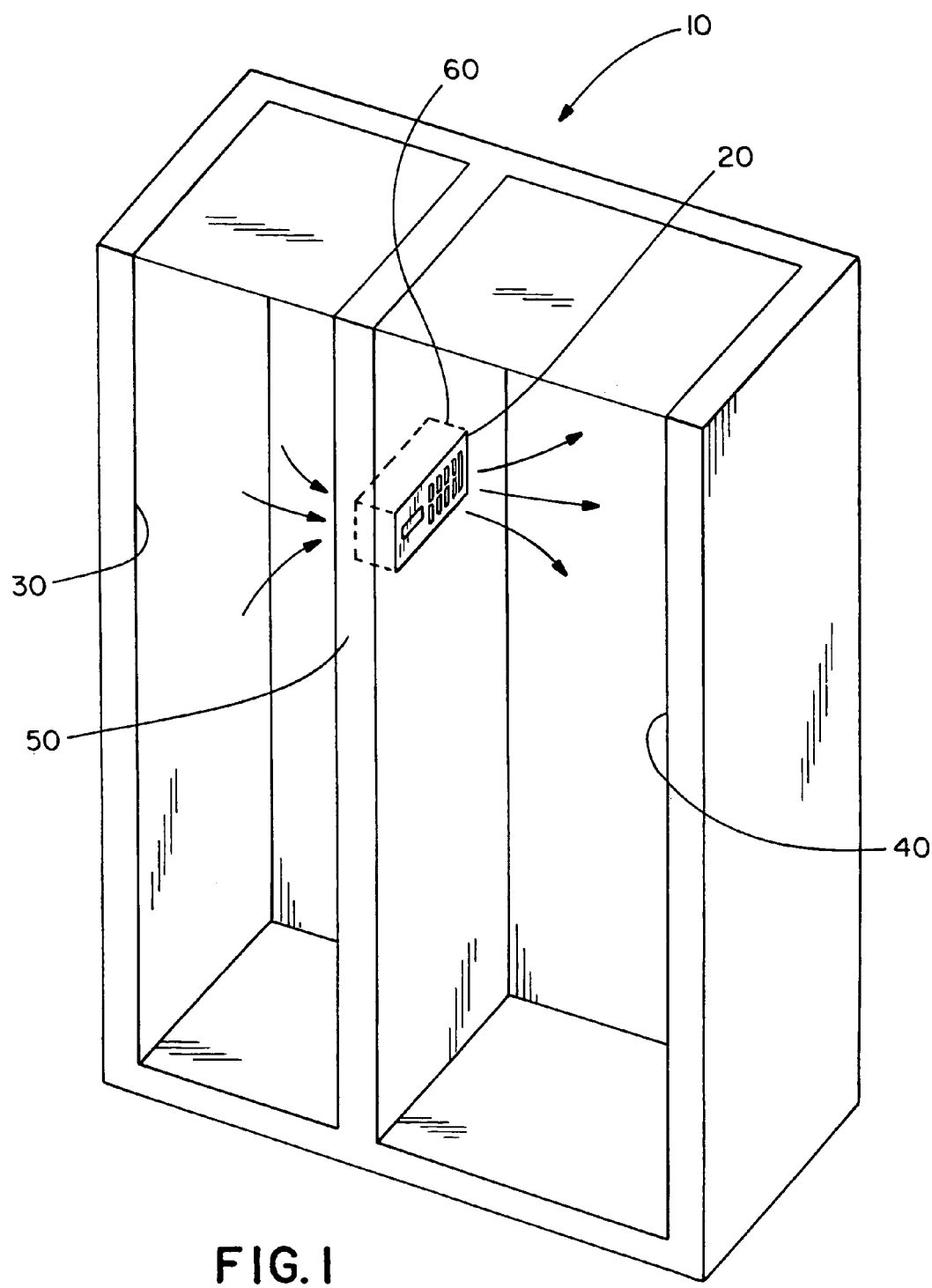
FIG. 1 is an perspective view of a conventional dual-compartment refrigerator employing one embodiment of the invention.

The following disclosure of the preferred embodiments is illustrative of the broad inventive concepts comprehended by the invention. One embodiment of the present invention is illustrated in FIG. 1. The invention is shown as employed in a conventional dual-compartment refrigerator 10, which contains two primary compartments. A dividing wall 50 separates a freezer compartment 30 and a fresh food compartment 40. The refrigerator 10 maintains an air temperature below freezing inside the freezer compartment 30 while the air temperature in the fresh food compartment 40 is maintained at a temperature above freezing and below a pre-set maximum. The compartments are connected by one or more air passages 60. Chilled air flows through the air passages 60 from the freezer compartment 30 to the fresh food compartment 40. The flow of the chilled air is regulated by an air control device 20 located in each of the air passages 60.

Air passages 60 may also connect the freezer compartment 30 directly to sub-compartments within the fresh-food compartment 40, such as a crisper bin or meat drawer. In these cases, air control devices 20 may be used to control the amount of chilled air that flows into those sub-compartments within the fresh food compartment 40. Since the device is used in the same manner for the fresh food compartment and any sub-compartments, this description will only concentrate on the air control device 20 used for the fresh food compartment 40.

Although this embodiment shows an air control device 20 in a refrigerator having the freezer compartment 30 on one side of the refrigerator and the fresh food compartment 40 on the other side, the present invention can be used in any other configuration of freezer compartment 30 and fresh food compartment 40, such as top and bottom.

Figure 2:
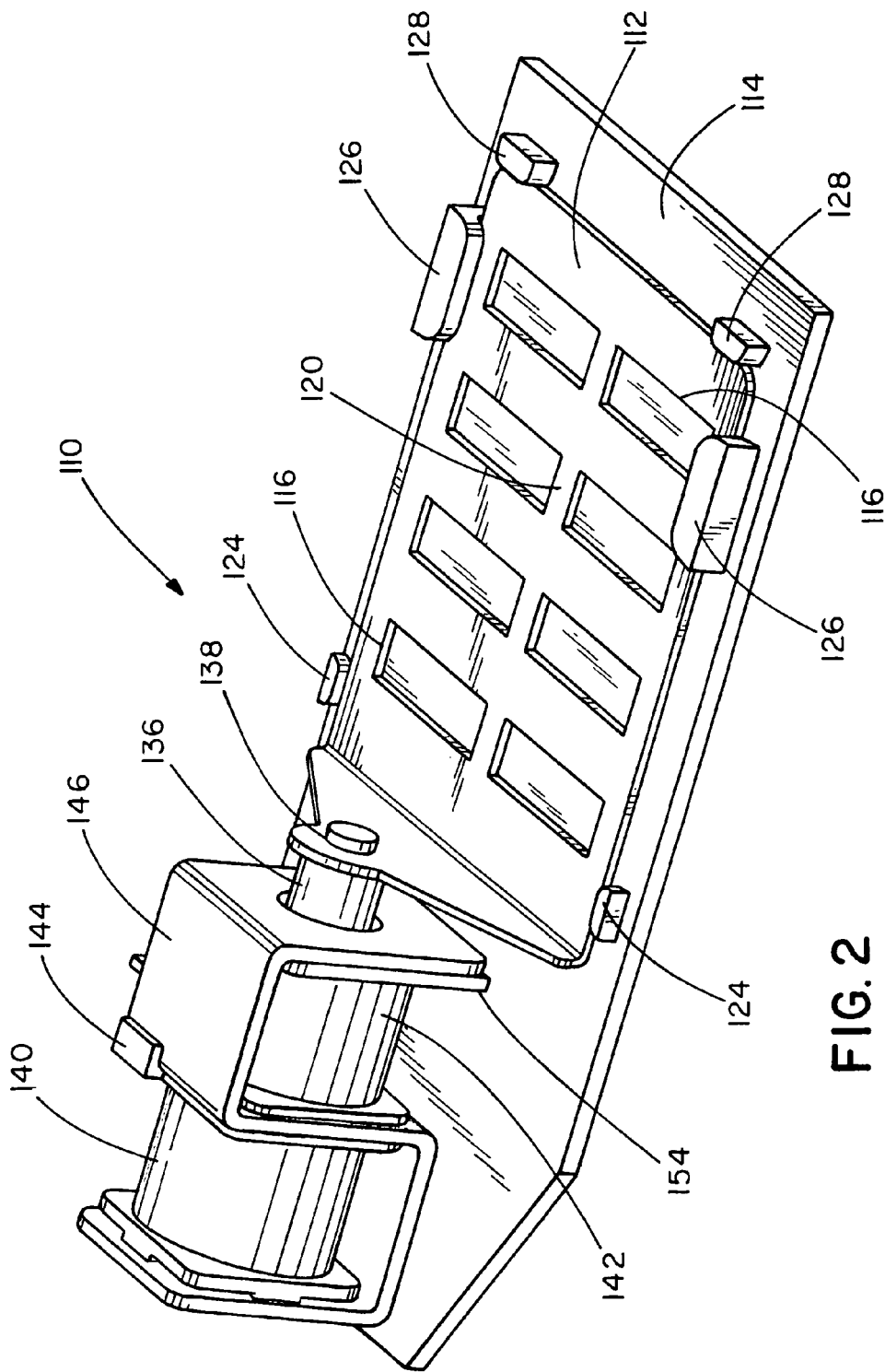
FIG. 2 is a perspective view of a baffle assembly in the closed position according to the invention.
Figure 3:
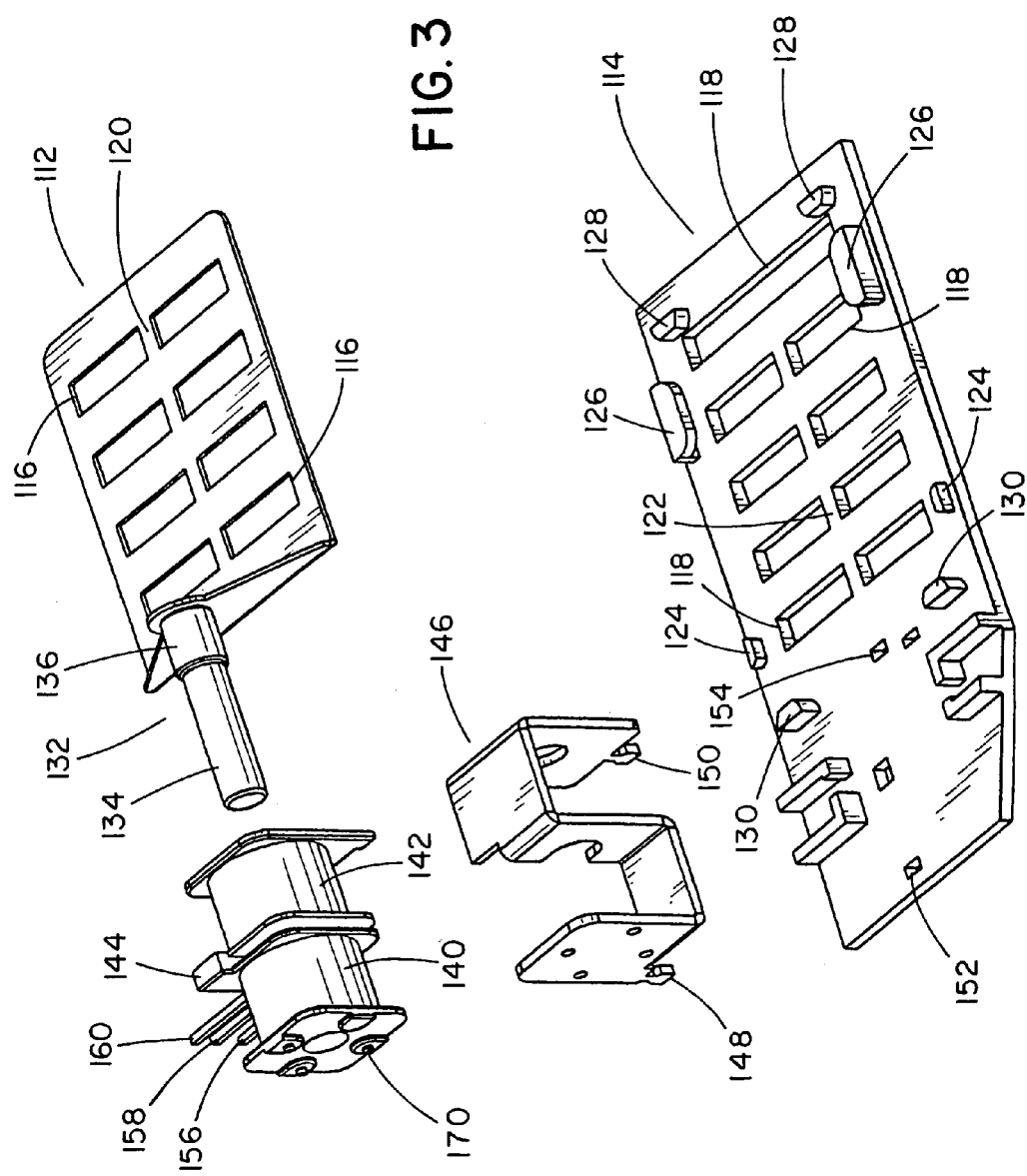
FIG. 3 is an exploded view of the device.

Referring to FIGS. 2–3, the air control device 20 employs a baffle assembly 110, which contains a movable plate 112 and a fixed plate 114. Both plates 112 and 114 are generally rectangular in shape. The movable plate 112 is constructed from a material with thermoconductive properties such as thin-sheet aluminum, steel or thermoconductive plastics. The fixed plate 114 may also be constructed of thermoconductive material. Materials with thermoconductive properties have a thermal conductivity greater than 0.3 W/mK (watts per meter per degree Kelvin).

Movable plate 112 and fixed plate 114 have a plurality of apertures 116 and 118, respectively. Some of the movable plate apertures 116 correspond with the fixed plate apertures 118. The fixed and movable plate apertures 116 and 118 may be positioned on opposite sides along the longitudinal centerline of the plate to create a solid centerline 120 and 122 on movable plate 112 and fixed plate 114, respectively. The solid centerlines 120 and 122 promote uniform and fast conduction of heat throughout the movable plate 112 and fixed plate 114. While a series of single lateral apertures across the movable plate 112 and fixed plate 114 may be used instead of multiple paired apertures that create a solid centerline, this will conduct heat less effectively, leading to less efficient melting of ice. Other aperture formations and alignments may also be used.

The fixed plate 114 is affixed inside the fresh food compartment 40 so that chilled air from the air passages 60 can flow through apertures 118. The movable plate 112 slides longitudinally along the fixed plate 114. Pairs of guides 124 and 126 are located on the fixed plate 114 to direct the movable plate 112 along the fixed plate 114. The pair of straight guides 124 are positioned at one end the fixed plate 114 to direct and contain the movable plate 112 laterally across the fixed plate 114. The pair of guides 126 project outward from and along the edge of the fixed plate 114. At the end of the guides 126, a portion extends over the edge surface of the movable plate 112, creating an L-shape. The guides 126 assist in containing the movable plate 112 laterally across the fixed plate 114 and impede vertical movement of the movable plate 112 relative to the fixed plate 114. In addition, two pair of end guides 128 and 130 are positioned at opposite ends of the fixed plate 114. The end guides 128 and 130 stop and contain the longitudinal movement of the movable plate 112. While ice may form between the guides 124, 126, 128 and 130, and the movable plate 112, heat conducting through the movable plate 112 will melt the accumulated ice.

Attached to the movable plate 112 is an armature 132 constructed of thermoconductive material and including a rear section 134 and a forward section 136. The armature forward section 136 is rod-shaped. In the preferred embodiment, the forward section 136 is constructed of nonmagnetic materials, such as nonmagnetic metals or thermoconductive plastics. However, magnetic materials will also work, but with less energy savings. The forward section 136 of the armature 132 is attached to the movable plate 112 by feeding the forward section 136 through a hole 138 on the end of the movable plate 112. Methods of attaching the armature 132 to the movable plate 112 can include using a nut screwed onto threads contained on the end of the forward section 136 of the armature 121, riveting the forward section 136 onto the end of the movable plate 112, and welding the forward section 136 to the end of the movable plate 112. The rod-shaped rear section 134 is constructed of magnetic, thermoconductive material, such as steel. As a result of this configuration, any movement of the armature 132 correspondingly causes movement of the movable plate 112. The armature forward section 136 and the movable plate 112 may also be constructed from a single thermoconductive, nonmagnetic piece, by molding the combination forward section 136 and movable plate 112 into the appropriate shape.

Figure 4:
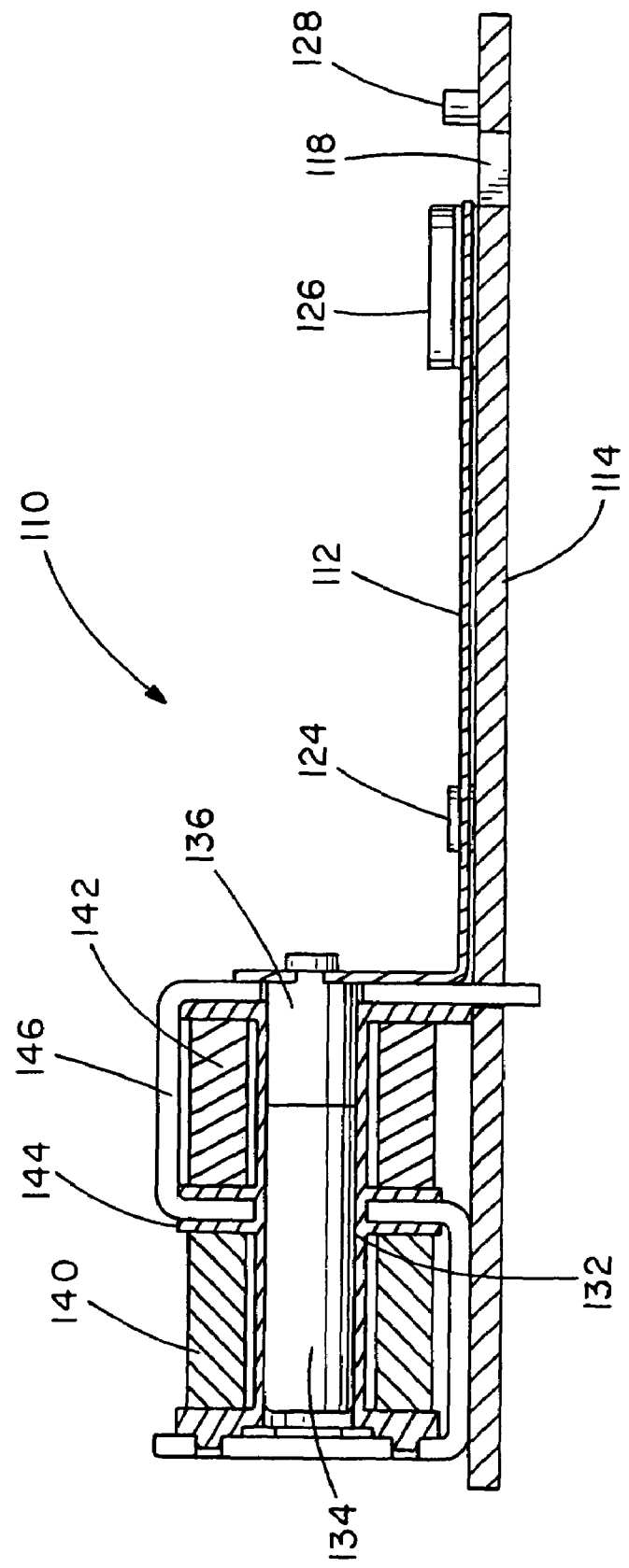
FIG. 4 is a sectional view of the device in the open position.

Referring to FIG. 4, the armature 132 is located radially inside a cavity formed by a first solenoid coil 140 and a second solenoid coil 142 aligned end-to-end. The solenoid coils 140 and 142 are employed to slide the armature 132 longitudinally within the cavity created by the solenoid coils 140 and 142 causing the movable plate 112 to slide longitudinally relative to the fixed plate 114. The solenoid coils 140 and 142 are wound in opposite directions around a bobbin assembly 144 to induce opposing magnetic fields.

Although in the preferred embodiment two separately wound solenoid coils are used, a single solenoid coil is also suitable. In the case of a single solenoid coil, an opposite charge applied to the magnetic wire wound around the bobbin would create opposite magnetic fields, thus having the same effect as using two separate solenoid coils. Use of a single solenoid coil increases the complexity of the device within the refrigerator since the device must be able to switch between two current flows rather than have separate flows.

The bobbin assembly 144 with the solenoid coils 140 and 142 may be affixed directly to the fixed plate 114 or mounted into a solenoid frame 146. Extending from the bottom of the solenoid frame 146 are mounting feet 148 and 150 that are secured to slots 152 and 154, respectively, located on the fixed plate 114, thereby attaching the frame 146 to the fixed plate 114. It is preferable to construct the frame 146 from magnetic materials, such as steel, in order to support the magnetic field generated by the solenoid coils 140 and 142. While nonmagnetic materials may also be used, this will require the solenoid coils 140 and 142 to be larger, thereby increasing the manufacturing cost for the device and the amount of energy used by the device.

Referring to FIG. 3, three electrical connecting pins 156, 158 and 160 extend outwardly from one side of the bobbin assembly 144. Electricity is provided to the pins 156, 158 and 160 by a control unit (not shown) connected to a temperature sensor (not shown) that measures the temperature of the fresh food compartment 40. Pin 156 is connected to and used for energizing solenoid coil 140. Pin 160 is connected to and used for energizing solenoid coil 142. Pin 158 is a common ground for both solenoid coils 140 and 142.

Figure 4A:
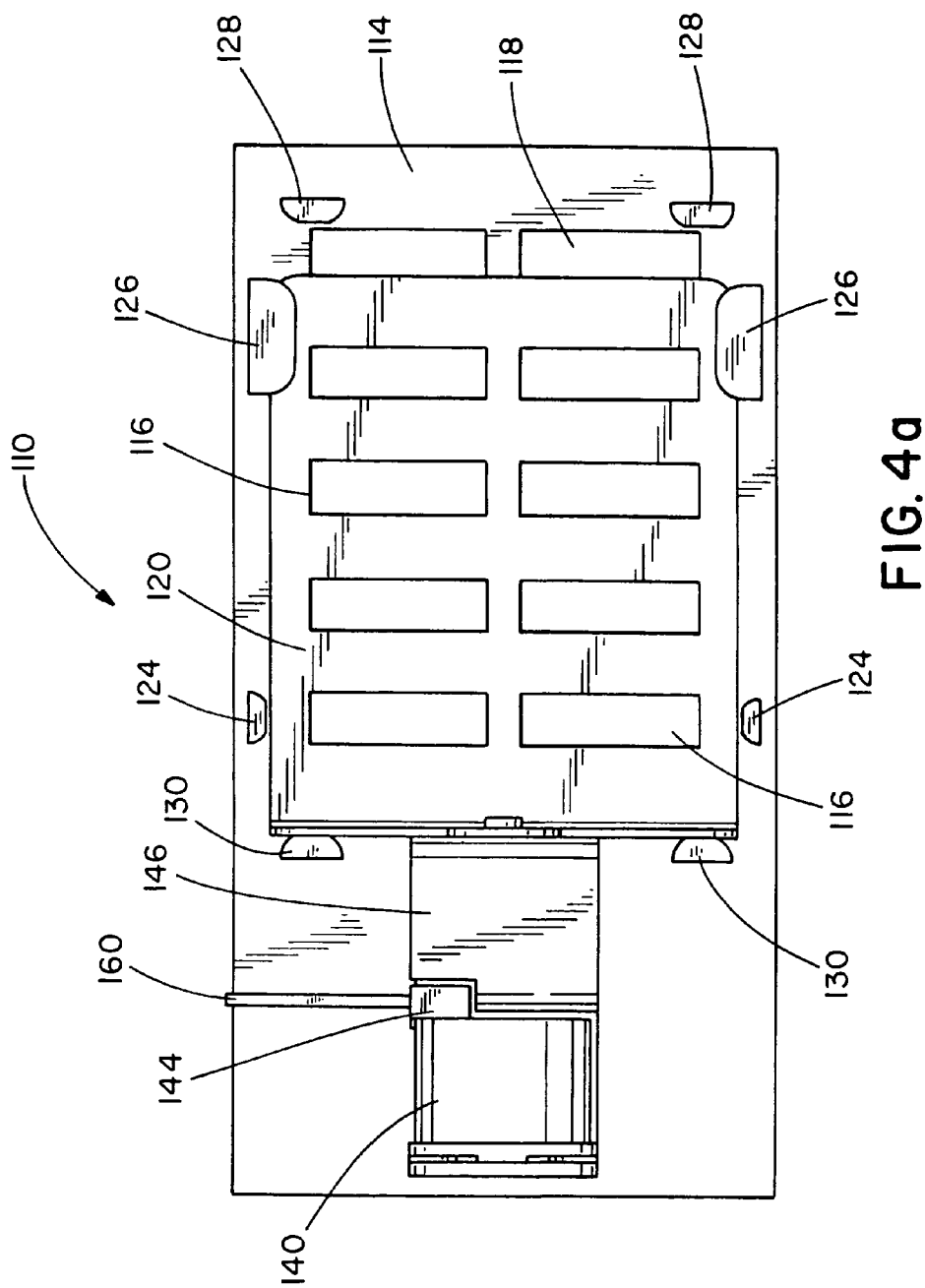
FIG. 4a is a plan view of the device in the opened position.
Figure 4B:
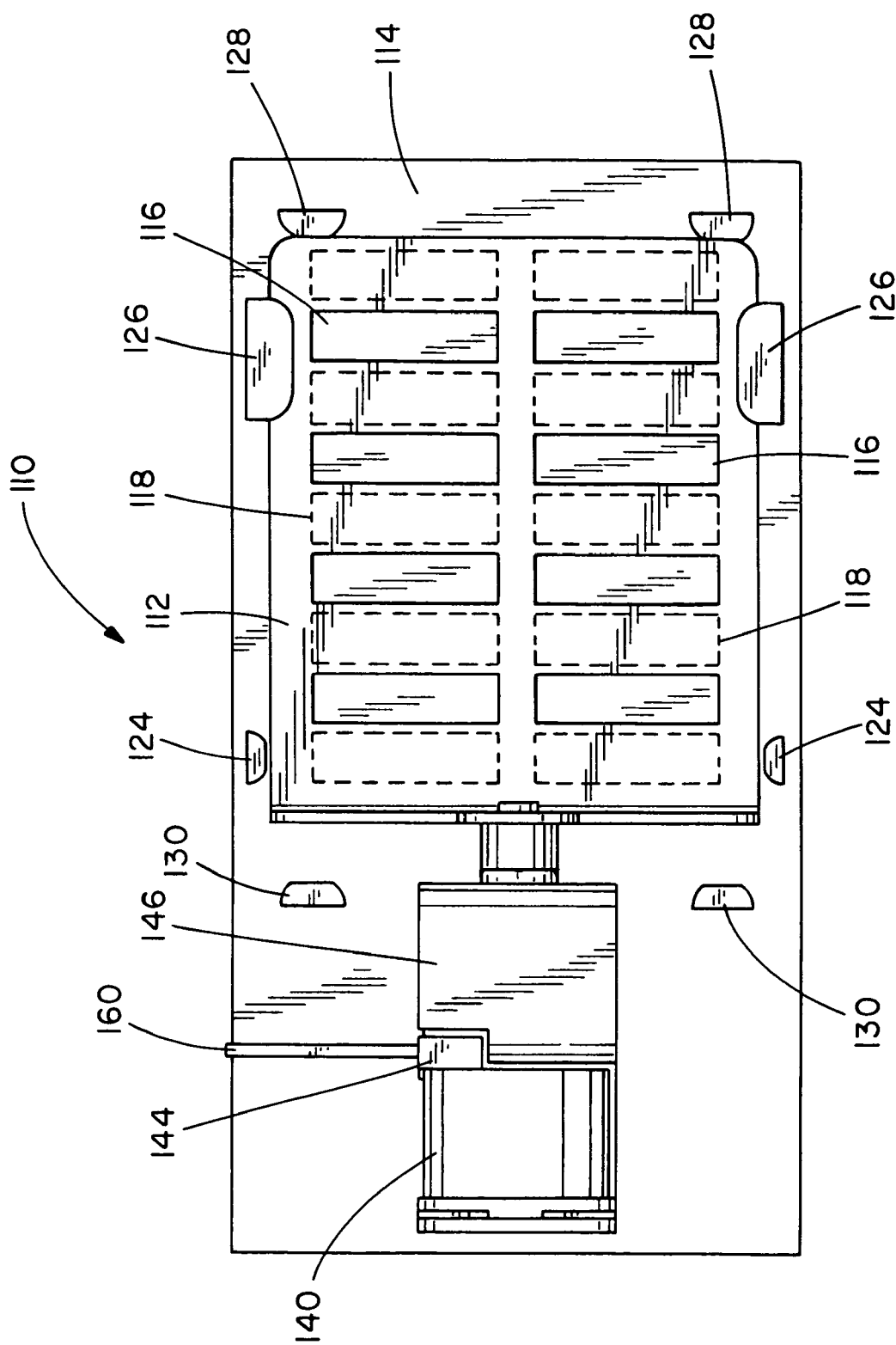
FIG. 4b is a plan view of the device in the closed position.

FIG. 4a shows the device in the opened position when the apertures 116 of the movable plate 112 align with the apertures 118 of the fixed plate 114, or are unobstructed by movable plate 112, thereby allowing chilled air to flow through the device. As seen in FIG. 4, in the opened position, the armature forward section 136 is located within the solenoid coil 142 and the armature rear section 134 is located within the solenoid coil 140. Conversely, as shown in FIG. 4b, the device is in the closed position when portions of the movable plate 112 cover the apertures 118 of the fixed plate 114, and apertures 116 of the movable plate 112 are covered by portions of the fixed plate 114, thereby preventing chilled air from passing through the device. In the closed position, the armature rear section 134 is located within the solenoid coil 142, and the forward section 136 is external to the solenoid coil 142 on the side closest the movable plate 112.

When the baffle assembly 110 is in the opened position, and the temperature sensor detects that the temperature in the fresh food compartment has fallen to a pre-selected level, electricity flows to pin 160, causing the solenoid coil 142 to become energized. The magnetic field created by the solenoid coil 142 attracts the magnetic armature rear section 134 into the cavity of the solenoid coil 142, thereby forcing a portion of forward section 136 to exit the cavity of the solenoid coil 142. Since the forward section 136 is not magnetically attracted to the field generated by the solenoid coil 142, the solenoid coil 142 does not need to overcome the magnetic properties of the forward section 136, thereby reducing the amount of energy required to move the armature 132. Moving the armature 132 such that part of section 136 exits the cavity of the solenoid coil 142 causes the movable plate 112 to slide into the closed position as shown in FIG. 4b. When the baffle assembly 110 is in the closed position and the temperature sensor detects that the temperature in the fresh food compartment 40 has risen to a pre-selected level, an electric signal is sent to the control unit and electricity flows to pin 156, thereby energizing the solenoid coil 140 and creating a magnetic field within solenoid coil 140 to retract the armature rear section 134 into the solenoid coil 140. The forward section 136 also withdraws into the solenoid coil 142, causing the movable plate 112 to slide into an opened position as shown in FIG. 4a.

The armature 132 can also be constructed of a single magnetic, thermoconductive rod connected to the movable plate 112. In this case, the device would require more energy to move the armature because the solenoid coils would need to create a stronger magnetic field to overcome the magnetic effects of the armature.

After one of solenoid coils 140 or 142 has been energized, the device attempts to determine if the movable plate 112 has moved into the appropriate position by monitoring the air temperature in the fresh food compartment 40. Once the air temperature has stopped rising, if the baffle assembly 110 was placed into the opened position, or stopped falling, if the baffle assembly 110 was placed in the closed position, then the energized solenoid coil 140 or 142 is deenergized. This method limits the amount of energy required by the device.

A natural by-product of energizing the solenoid coils 140 and 142 is the generation of heat. Once either solenoid coil 140 or 142 is energized, if the plates 112 and 114 are frozen together, the movable plate 112 will not move relative to the fixed plate 114. The heat generated by energizing solenoid coil 140 or 142 migrates from the solenoid coil 140 or 142 to the armature components 134 and 136 and throughout the movable plate 112. In addition, the fixed plate 114 and the solenoid frame 146 may also be constructed of thermoconductive material. In that case, heat generated by the solenoid coil 140 or 142 also migrates through the solenoid frame 146 and throughout the fixed plate 114. The heat conduction through the plates 112 and 114 melts the accumulated ice, allowing the movable plate 112 to slide into the appropriate position. Once the temperature sensor detects that the temperature has stopped rising or falling, the applicable solenoid coil 140 or 142 is deactivated, ceasing the production of heat and the use of energy. Irrespective of whether a single magnetic armature or a two-part armature is used, the solenoid coils 140 and 142 will produce enough energy to generate the appropriate amount of heat in order to melt any accumulated ice.

Referring to FIG. 3, offsets 170 are located at the end of the solenoid bobbin 144 closest to solenoid coil 140. Offsets 170 create an air gap between frame 146 and the end of solenoid bobbin 144. Because air is a very poor conductor of heat, the air gap retards the conduction of heat through that end of the frame 146 and encourages the heat to migrate towards the movable plate 112. By directing heat towards the movable plate 112, a higher concentration of heat will migrate to the movable plate 112 in order to melt the accumulated ice. Without the offsets 170, a significant portion of heat would be directed toward the end of the frame away from the movable plate 112. While some of this heat would ultimately migrate to the plates 112 and 114, much of the heat would be dispersed to the outside environment and not maintained within the device.

In the preferred embodiment, the baffle assembly 110 is mounted such that the movable plate 112 moves in a horizontal plane, unaffected by the force of gravity. In this position, the movable plate 112 will maintain its position after either solenoid coil 140 or 142 is deactivated. In certain circumstances, it may be preferable to mount the baffle assembly 110 at an angle other than horizontal. In such a position, gravity may act upon the movable plate 112 once either solenoid coil 140 or 142 is deactivated, and force the movable plate 112 into an undesirable position. Referring to FIG. 5, one embodiment of the invention to overcome this problem is shown, in which the position of the movable plate 212 is maintained after the electric current to the solenoid coil 240 or 242 is removed. In this embodiment, an L-shaped frame extension 272 is attached to the solenoid frame 246 at the end opposite the movable plate 212. The armature 232 is extended through the end of the solenoid frame 246, opposite from the movable plate 212 between the inside wall 274 of the frame extension 272 and outside wall 276 of the frame 246. Attached around the circumference and near the end of the extended armature 232, opposite the movable plate 212, is a magnet 278. The magnet 278 may be attached such that it is flush with the end of the extended armature 232, or attached so that the armature 232 extends a given distance beyond the end of the magnet 278, as shown in FIG. 5. When the magnet 278 is attached as shown in FIG. 5, the armature 232 will extend through a hole in the frame extension 272.

As shown in FIG. 5, when the baffle assembly 210 is in the opened position, the magnet 278 makes contact with the inside wall 274 of the frame extension 272. Conversely, as shown in FIG. 6, in the closed position, the magnet 278 makes contact with the outside wall 276 of the solenoid frame 264. By contacting either the outside wall 276 of the solenoid frame 246 or the inside wall 274 of the frame extension 272, the magnet 278 will attract to either surface, and the movable plate 212 will maintain its position without requiring the appropriate solenoid coil 240 or 242 to remain energized. Moving from the opened to closed position, the solenoid coil 242 uses more energy to overcome the attraction force of the magnet 278 against the inside wall 274 of the frame extension 272. Likewise, when moving from a closed to an opened position, the solenoid coil 240 must overcome the magnetic attraction of the magnet 278 to the outside wall 276 of the frame 246.

Figure 7:
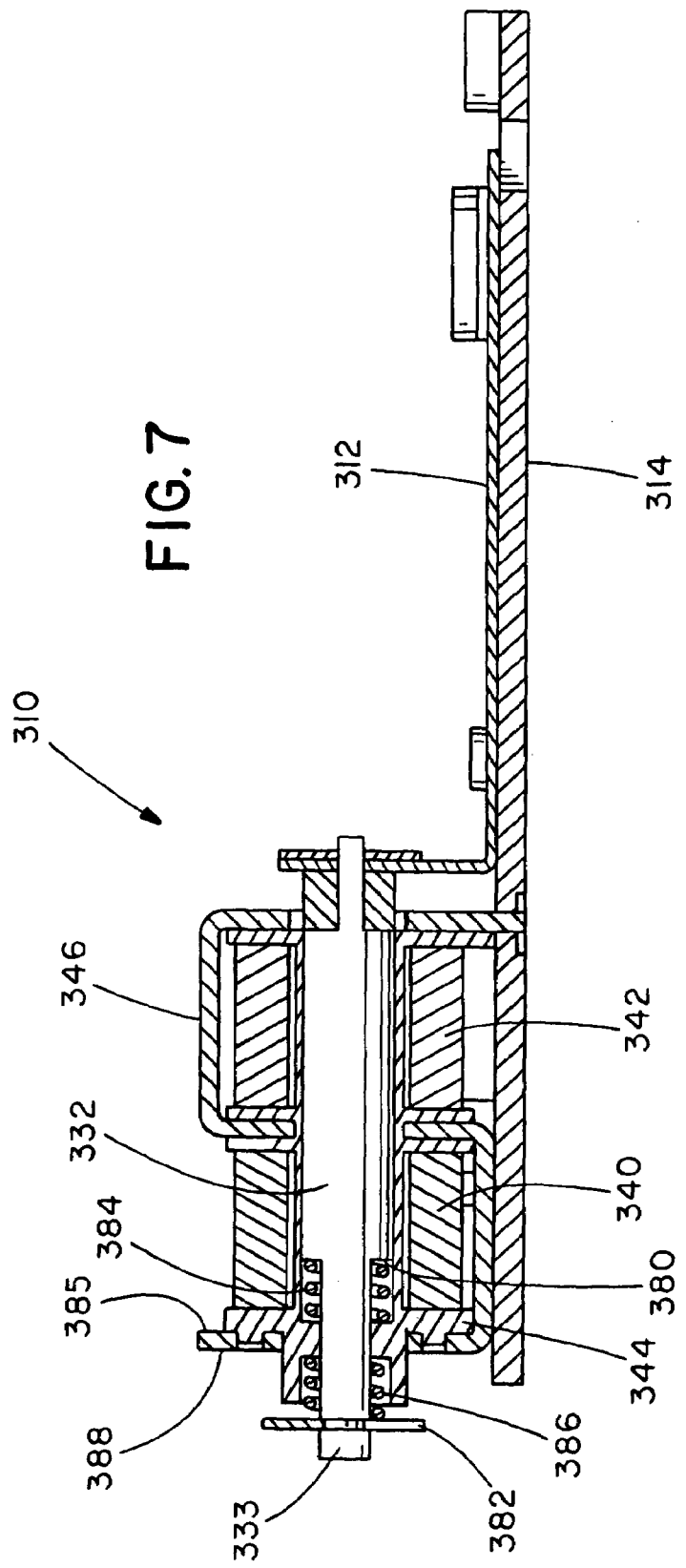
FIG. 7 is a sectional view of another embodiment showing the device in a partially opened position.
Figure 8:
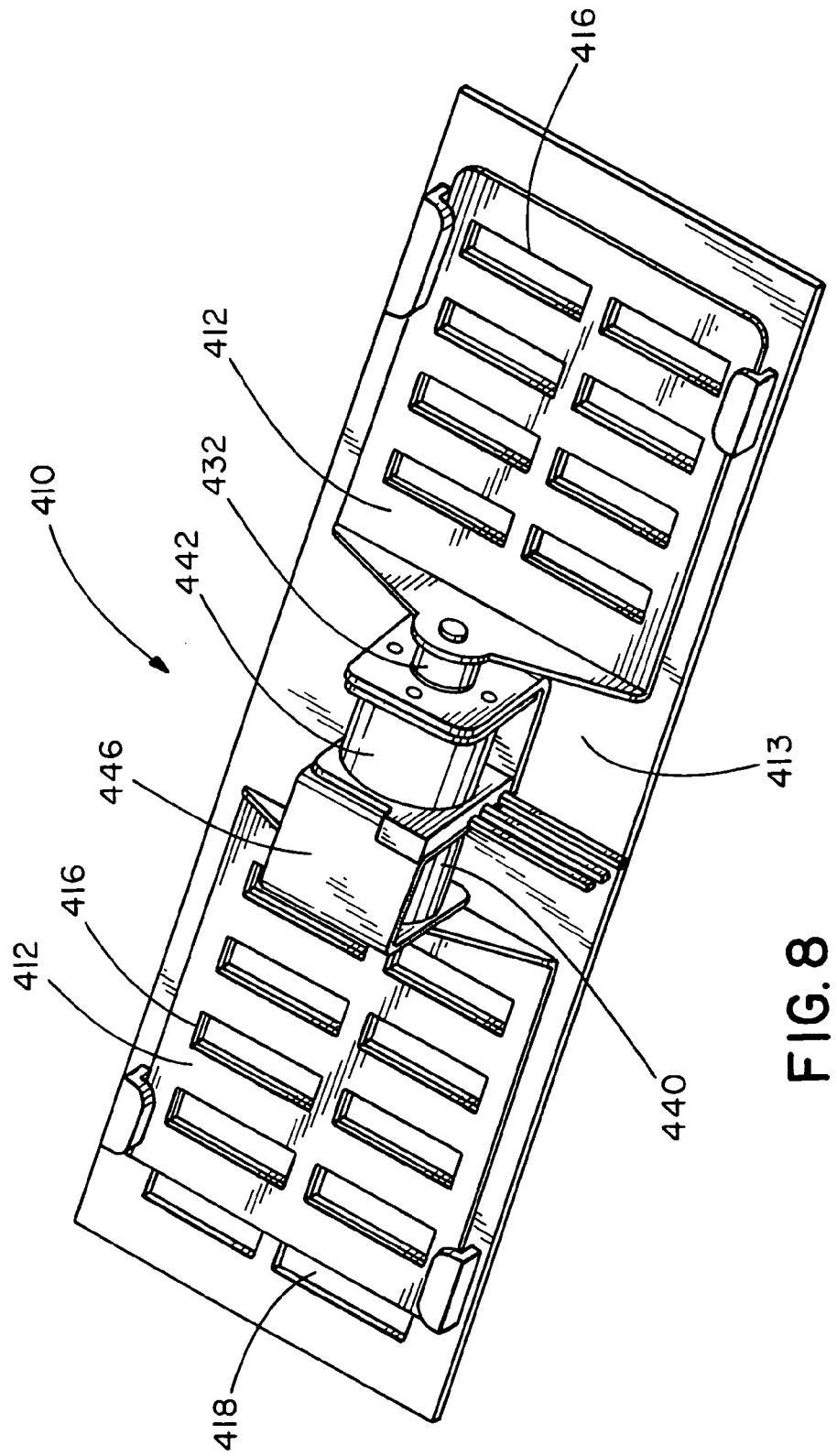
FIG. 8 is a prospective view of another embodiment of the invention having two movable pates coupled to opposite ends of an armature.
Figure 9:
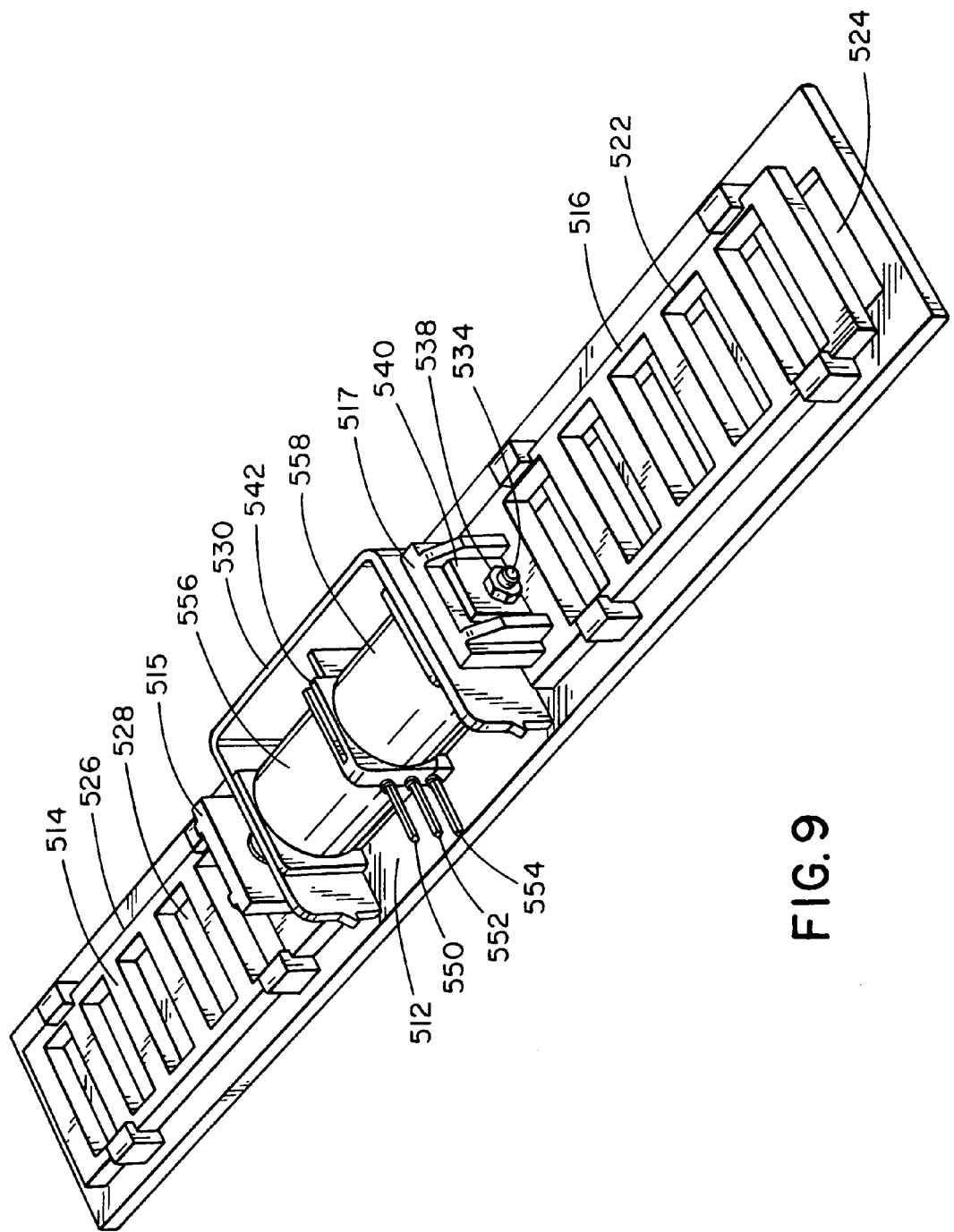
FIG. 9 is a prospective view of the top of yet another embodiment for the invention having two movable plates.
Figure 10:
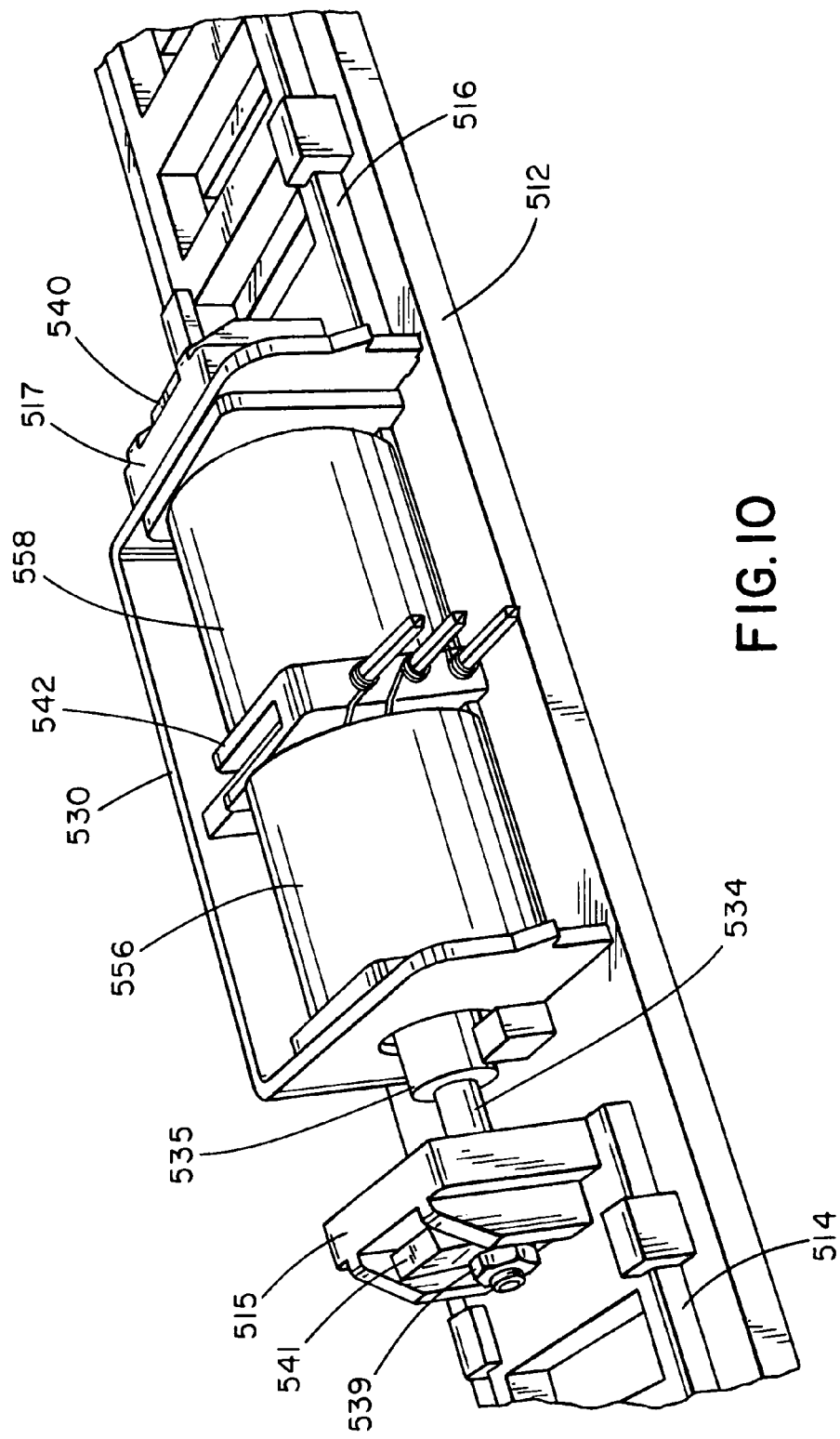
FIG. 10 is a close-up view of the solenoid coils and surrounding components of the embodiment of the invention shown in FIG. 9.
Figure 11:
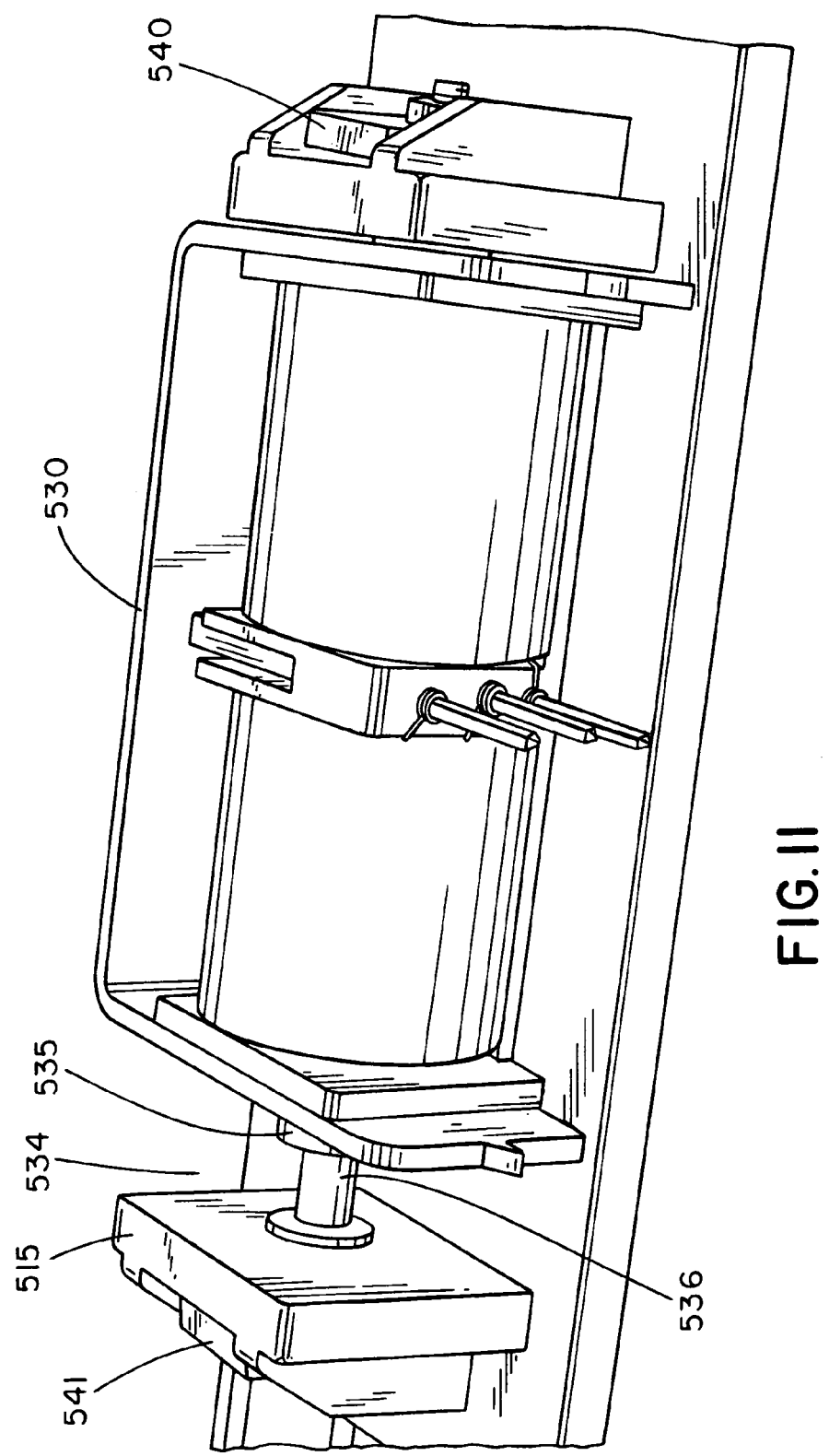
FIG. 11 is another view of the embodiment of the invention of FIG. 9.
Figure 12:
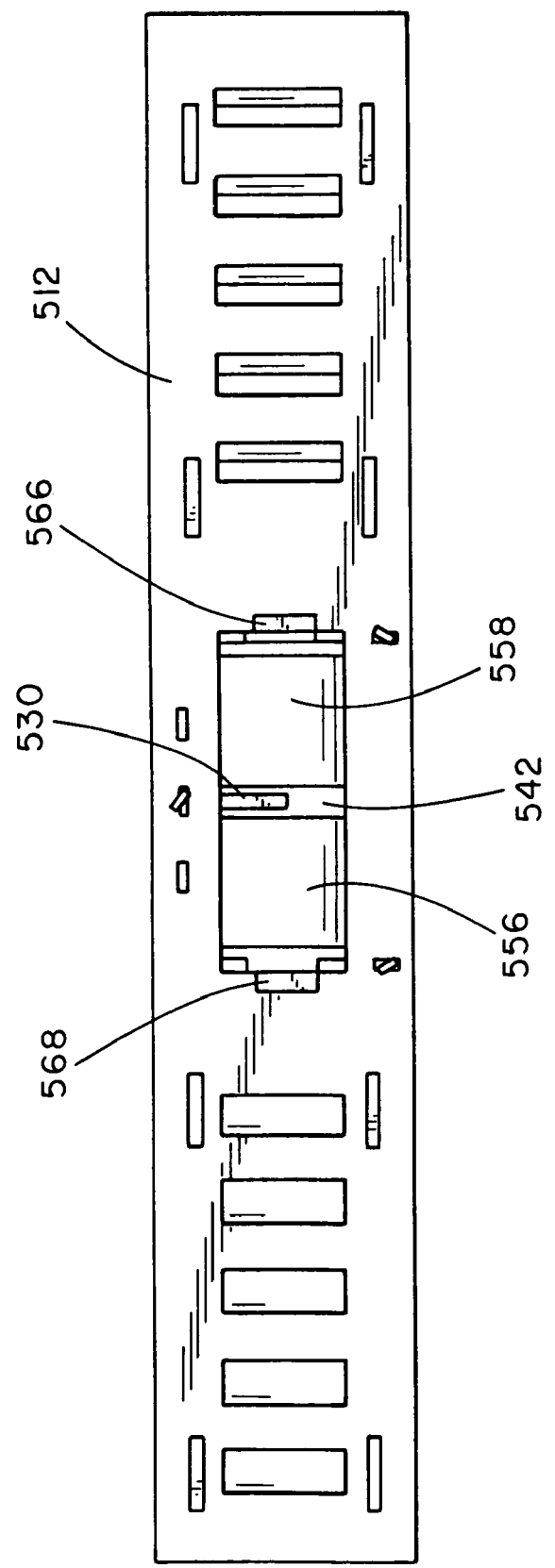
FIG. 12 is a view of the underside of the invention of FIG. 9.
Figure 13:
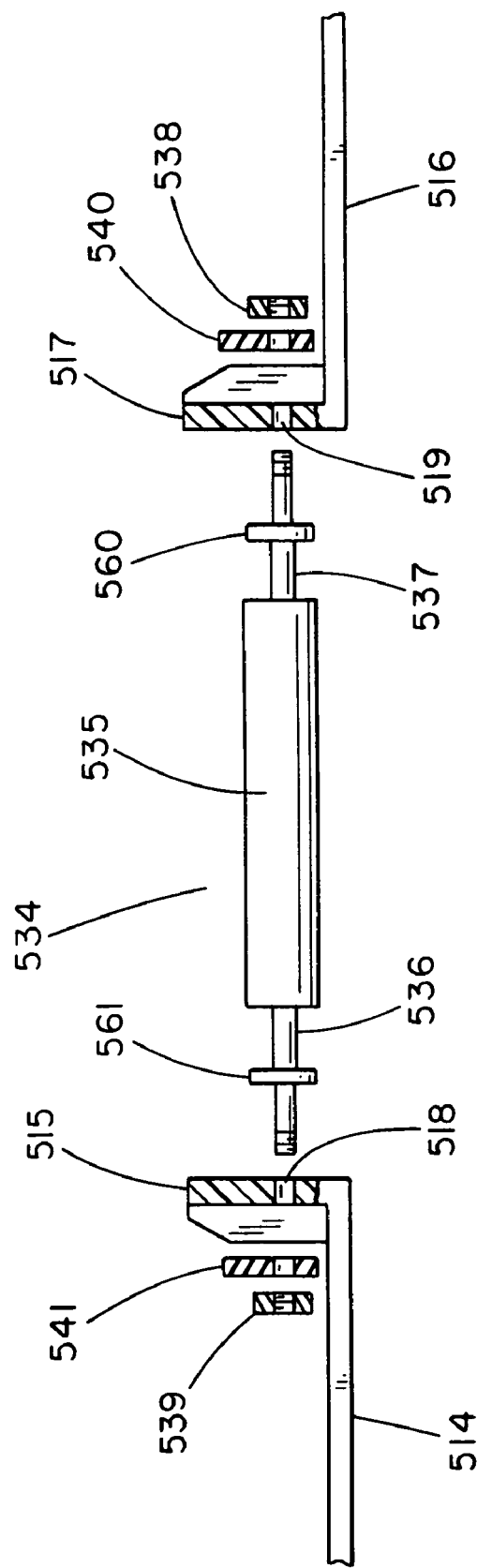
FIG. 13 is an exploded view of the armature and connected components employed in the embodiment shown in FIG. 9.

Another embodiment of the invention is shown in FIG. 7. In this embodiment, when the baffle assembly 310 is placed in the closed position, the device may either maintain the closed position, or be placed in a partially opened position to allow a limited amount of chilled air to enter the fresh food compartment 40. Allowing a limited amount of chilled air into the fresh food compartment 40 maintains the temperature below the pre-selected temperature that would cause the baffle assembly 310 to open and allow a much larger amount of chilled air into the fresh food compartment 40. Since only a limited amount of chilled air is needed, rather than the larger amount that is provided when the baffle assembly 310 is in the opened position, the refrigeration unit does not cycle on as frequently to generate chilled air, reducing the refrigerator's overall energy consumption. This embodiment is particularly effective when the door to the fresh food compartment 40 remains closed for long periods of time, such as at night.

Referring to FIG. 7, the armature 332 includes an extended portion 333, having a diameter smaller than the rest of the armature 332. The extended portion 333 extends through the end of the solenoid bobbin 344 opposite from the movable plate 312. A circular shoulder 380 exists at the point where the extended portion 333 is connected to the armature 332, between the diameter of the armature 332 and the reduced diameter of the extended portion 333. A mandrel or pin 382 is perpendicularly positioned through the axis of the extended portion 333 near the end of the armature 332 opposite from the movable plate 312. A front control spring 384 is positioned around the extended portion 333 between the shoulder 380 and the inside wall 385 of the solenoid frame 346. A back control spring 386 is positioned around the extended portion 333 between the outside wall 388 of the solenoid frame 346 and the pin or mandrel 382.

In this embodiment of the device, when the solenoid coils 340 and 342 are not energized, portions of the movable plate 312 partially cover the apertures of the fixed plate 314 allowing a minimal amount of chilled air to flow into the fresh food compartment 40. When the solenoid coil 340 is energized, the movable plate 312 is slid so that the device is placed in an opened position and the front control spring 384 is compressed between the shoulder 380 and the inside wall 385 of the frame 346. The electricity to the solenoid coil 340 must be maintained in order to keep the device in an opened position. When the electric current is removed from the solenoid coil 340, the compressed front control spring 384 extends to slide the movable plate 312 toward its closed position, thereby exerting a force on the back control spring 386. Once the pressures from the front control spring 384 and the back control spring 386 balance, the movable plate 312 will be situated such that the baffle assembly 310 is partially opened. This will allow a small amount of chilled air to flow into the fresh food compartment 40.

The device may also be placed in a completely closed position by energizing the solenoid coil 342. This causes the armature 332 to be attracted to the solenoid coil 342, thereby sliding the movable baffle 312 into a closed position and compressing the back control spring 386 between the outside wall 388 of the solenoid frame 346 and the pin or mandrel 382. To maintain the completely closed position, the solenoid coil 342 must continue to be energized after the movable baffle 312 has moved into the closed position.

In another embodiment of the invention, a baffle assembly 410 is shown having two movable plates 412 attached to the opposite ends of an armature 432. Each movable plate 412 contains one or more apertures 416. The armature 432 resides inside two solenoid coils 440 and 442. The solenoid coils are contained within a frame 445, which is attached to a fixed plate 413.

Two sets of one or more apertures 418 are located on the fixed plate 413, arranged on opposite sides of the solenoid frame 446. The movable plates 412 are arranged relative to the fixed plate 413 such that in one position, the apertures 416 on the movable plates 412 are aligned with the apertures 418 on the fixed plate 413, allowing air to flow through the baffle assembly 410, and in a second position, the apertures 418 on the fixed plate 413 are blocked by solid portions of the movable plates 412, thus inhibiting the flow of air through the baffle assembly 410. This embodiment allows more chilled air to flow into the fresh food compartment 40 while employing only one set of solenoid coils 440 and 442 and one armature 432. This embodiment also encompasses the deicing capabilities of previously described embodiments of this invention since heat generated by the solenoid coils 440 and 442 is dissipated through the armature 432 to both movable plates 412, and through the solenoid frame 446 to the fixed plate 413.

In another embodiment of the invention shown in FIGS. 9–13. a baffle assembly 510 is shown having two movable plates 514 and 516 attached to the opposite end of an armature 534. The first movable plate 514 contains one or more apertures 526 and the second movable plate 516 contains one or more apertures 522. The armature 534 resides inside two solenoid coils 556 and 558, which are wound in opposite directions around a bobbin assembly 542 to induce opposing magnetic fields. The bobbin assembly 542 is mounted into a frame 530. The frame 530 is attached to the fixed plate 512 such that the frame 530 and the bobbin assembly 542 are flush with the underside of fixed plate 512.

Two sets of one or more apertures 524 and 528 are arranged on the fixed plate 512 on opposite sides of the solenoid frame 530. The moveable plates 514 and 516 are arranged relative to the fixed plate 512 such that in one position, the apertures 522 and 526 on the movable plates 516 and 514, respectively, are aligned with the apertures 524 and 528 on the fixed plate 512, allowing air to flow through the baffle assembly 510, and in a second position, the apertures 524 and 528 on the fixed plate 512 are blocked by solid portions of the movable plates 516 and 514, respectively, thus inhibiting the flow of air through the baffle assembly 510. Similar to the previous embodiment, this embodiment allows more chilled air to flow into the fresh food compartment 40 while employing only one set of solenoid coils 556 and 558 and one armature 534.

Sound dampening features are employed in this embodiment to minimize the noise generated when the solenoid coils 556 and 558 are engaged. Flanges 515 and 517 are located on the ends of movable plates 514 and 516, respectively. Opposite ends of armature 534 extend through the apertures 518 and 519 located in flanges 515 and 517 and are secured to the armature 534 by fasteners 538 and 539, which hold the flanges 515 and 517 tight against armature flanges 561 and 560. Sound dampeners 541 and 540 are placed on the opposite ends of armature 534, between fasteners 538 and 539 and flanges 515 and 517 to eliminate any movement of the armature 534 relative to the movable plates 514 and 516.

Sound dampeners 566 and 568 are attached to the bobbin assembly 542. When either of the flanges 515 or 517 are pulled toward the frame 530, depending on which solenoid coil 556 or 558 is energized, the flange 515 or 517 makes contact with the sound dampener 568 or 566, respectively, and contact with the frame 530 is prohibited or greatly minimized.

In a further effort to reduce the noise created by operation, the armature 534 has two smaller diameter sections 536 and 537 on opposite ends of a larger diameter mid-section 535. When one of the solenoid coils 556, 558 is energized, thereby creating a magnetic field around the armature 534, the force pulls strongly upon the larger diameter mid-section 535. As one of the smaller diameter sections 536, 537, enters the cavity created by the solenoid coils 556, 558, the force on the armature weakens. This sequence allows the movable plates 514, 516 to move into position smoothly, without the hard slamming associated with uniformly sized armatures.

Thus, there has been disclosed a baffle assembly for an air control device used in conventional, multi-compartment refrigerators. This invention utilizes heat generated by solenoid coils and thermoconductive plates to conduct the heat in order to melt the accumulated ice on the plates. The invention accomplishes this at a reduced energy output because the generation of heat is a natural consequence of solenoid coils. Energy is also reduced because the solenoid coil is only energized when required to open or close the baffle assembly in the air control device. The solenoid coils do not need to be energized for other reasons such as preventing the accumulation of ice on the plates. Additionally, since the invention does not require extra heating elements to melt accumulated ice, the additional energy and complexity of a heating element is not required. Finally, the invention also reduces the amount of energy required through the use of a two-part armature assembly, because the coils do not need to overcome the effects of a completely magnetic armature.

Whereas the present invention has been described with respect to specific embodiments thereof, it will be understood that various changes and modifications will be suggested to one of ordinary skill in the art, and it is intended that the invention encompass such changes and modifications as fall within the scope of the appended claims.

What is claimed is:

1. A baffle assembly for an air control device comprising:
   a first plate having one or more apertures located on a first end of said first plate and one or more apertures located on a second end of said first plate;
   a solenoid coil residing within a frame, said frame attached to said first plate and located between said apertures on said first end of said first plate and said apertures on said second end of said first plate;
   an armature located within said solenoid coil;
   a second plate attached to a first end of said armature, said second plate being movable relative to said first plate;
   a third plate attached to a second end of said armature, said third plate being movable relative to said first plate;
   a bobbin assembly housing said first solenoid coil, said bobbin assembly attached to said frame;
   a first sound dampener attached to said bobbin assembly, wherein said first sound dampener inhibits contact between said second plate and said frame;
   wherein movement of said armature to one position within said solenoid coil causes air flow through said apertures in said first plate to be blocked by said second and third plates and movement of said armature within said solenoid coil to a second position causes air flow through said apertures in said first plate to be unimpeded.

2. The baffle assembly recited in claim 1 further comprising a second sound dampener attached to said bobbin assembly, wherein said second sound dampener inhibits contact between said third plate and said frame.

3. The baffle assembly recited in claim 1 further comprising at least one second sound dampener positioned on said armature, one of said at least one second sound dampeners precluding movement of said armature with respect to at least one of said second plate and said third plate.

4. A baffle assembly for an air control device comprising:
   a first plate, said first plate defining at least one aperture in a first portion of said plate;
   a solenoid coil attached to said first plate;
   an armature located within said solenoid coil;
   a second plate attached to a first end of said armature, said second plate being movable relative to said first plate between a first position wherein said second plate substantially occludes said at least one aperture in said first portion of said plate and a second position wherein said second plate does not substantially occlude said at least one aperture in said first portion of said plate;
   at least one first sound dampener positioned on said armature, one of said at least one first sound dampener precluding movement of said armature with respect to said second plate.

5. The baffle assembly recited in claim 4 further comprising:
   a frame, said solenoid coil attached to said frame;
   a bobbin assembly housing said solenoid coil; and
   at least one second sound dampener attached to said bobbin assembly, said at least one second sound dampener inhibiting contact between said second plate and said frame.

6. The baffle assembly recited in claim 4 further comprising a third plate attached to a second end of said armature, and said first plate further defining at least one aperture in a second portion of said first plate, said third plate being movable relative to said first plate between a first position wherein said third plate substantially occludes said at least one aperture in said second portion of said plate and a second position wherein said third plate does not substantially occlude said at least one aperture in said second portion of said plate.

7. The baffle assembly recited in claim 6 further comprising another of said at least one first sound dampeners precluding movement of said armature with respect to said third plate.

8. The baffle assembly recited in claim 6 further comprising:
   a frame, said solenoid coil attached to said frame;
   a bobbin assembly housing said solenoid coil; and
   at least one second sound dampener attached to said bobbin assembly, one of said at least one second sound dampeners inhibiting contact between said second plate and said frame.

9. The baffle assembly recited in claim 8 further comprising another of said at least one second sound dampeners inhibiting contact between said third plate and said frame.

10. A baffle assembly for an air control device comprising:
    a first plate, said first plate defining at least one aperture in a first portion of said plate;
    a frame attached to said first plate;
    a solenoid coil attached to said frame;
    an armature located within said first solenoid coil;

a bobbin assembly housing said solenoid coil;

at least one first sound dampener attached to said bobbin assembly, said at least one first sound dampener inhibiting contact between said second plate and said frame;

a second plate attached to a first end of said armature, said second plate being movable relative to said first plate between a first position wherein said second plate substantially occludes said at least one aperture in said first portion of said plate and a second position wherein said second plate does not substantially occlude said at least one aperture in said first portion of said plate.

11. The baffle assembly recited in claim 10 further comprising at least one second sound dampener positioned on said armature, one of said at least one second sound dampeners precluding movement of said armature with respect to said second plate.

12. The baffle assembly recited in claim 10 further comprising a third plate attached to a second end of said armature, and said first plate further defining at least one aperture in a second portion of said first plate, said third plate being movable relative to said first plate between a first position wherein said third plate substantially occludes said at least one aperture in said second portion of said plate and a second position wherein said third plate does not substantially occlude said at least one aperture in said second portion of said plate.

13. The baffle assembly recited in claim 12 further comprising at least one second sound dampener positioned on said armature, one of said at least one second sound dampeners precluding movement of said armature with respect to said second plate.

14. The baffle assembly recited in claim 13 further comprising another of said at least one second sound dampeners precluding movement of said armature with respect to said third plate.

15. The baffle assembly recited in claim 12 further comprising another of said at least one first sound dampeners inhibiting contact between said third plate and said frame.

* * * * *